United States Patent
Jeng et al.

(10) Patent No.: US 9,464,703 B2
(45) Date of Patent: Oct. 11, 2016

(54) BALL SCREW CAPABLE OF SENSING PRELOAD

(71) Applicant: NATIONAL CHUNG CHENG UNIVERSITY, Chia-Yi County (TW)

(72) Inventors: Yeau-Ren Jeng, Tainan (TW); Yu-Xian Huang, Tainan (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 478 days.

(21) Appl. No.: 13/944,309

(22) Filed: Jul. 17, 2013

(65) Prior Publication Data
US 2015/0020628 A1 Jan. 22, 2015

(51) Int. Cl.
*F16H 25/22* (2006.01)

(52) U.S. Cl.
CPC ...... *F16H 25/2204* (2013.01); *Y10T 74/19744* (2015.01)

(58) Field of Classification Search
CPC ... F16H 2057/012; F16H 57/01; F16C 19/52
USPC .......................................... 74/424.82–424.87
See application file for complete search history.

(56) References Cited

U.S. PATENT DOCUMENTS

| 3,252,745 | A | * | 5/1966 | Korrenn | F16C 19/52 384/448 |
| 4,704,895 | A | * | 11/1987 | Boing | B23Q 17/09 73/104 |
| 5,585,577 | A | * | 12/1996 | Lemoine | B21B 31/07 374/153 |
| 5,644,951 | A | * | 7/1997 | Hatamura | B23Q 1/34 74/424.72 |
| 6,484,582 | B2 | * | 11/2002 | Ehrfeld | F16C 19/522 384/448 |
| 6,490,935 | B1 | * | 12/2002 | Joki | G01L 3/1464 73/862.49 |
| 6,799,928 | B2 | * | 10/2004 | Port-Robach | G01B 7/284 116/208 |
| 7,634,913 | B2 | * | 12/2009 | Singh | F01D 17/02 324/207.19 |
| 7,650,802 | B2 | * | 1/2010 | Duret | F16C 19/522 73/760 |
| 7,930,949 | B2 | * | 4/2011 | Singh | F16H 25/20 74/424.71 |
| 8,596,146 | B2 | * | 12/2013 | Ono | B60B 27/0005 384/448 |
| 2009/0009158 | A1 | * | 1/2009 | Singh | F16C 29/0633 324/207.15 |

FOREIGN PATENT DOCUMENTS

TW 201204960 2/2012

* cited by examiner

*Primary Examiner* — David M Fenstermacher
(74) *Attorney, Agent, or Firm* — Muncy, Geissler, Olds & Lowe, P.C.

(57) ABSTRACT

A ball screw capable of sensing a preload is formed of a nut having an internal thread surrounding an imaginary central axis, a screw inserted into the nut and having an external thread surrounding the imaginary central axis, and a plurality of balls are mounted between the internal and external threads in a way that the balls roll therebetween. A mounting hole having a mounting surface therein is formed in the nut. The mounting surface corresponds to the internal thread in a way that it is substantially perpendicular to the imaginary central axis. A force sensor is mounted to the mounting surface. The force sensor can directly sense the preload in real time, so it is uneasily adversely affected by any environmental factor to have more accurate sensing result relatively.

7 Claims, 2 Drawing Sheets

BALL SCREW CAPABLE OF SENSING PRELOAD

BACKGROUND OF THE INVENTION

1. Field of the Invention

The present invention relates generally to a ball screw and more particularly, to a ball screw capable of sensing a preload.

2. Description of the Related Art

The ball screw is a common component for precision positioning and includes a screw for rotation driven by a motor, a nut for linear movement driven by the screw, and a plurality of balls mounted between the screw and nut. Rolling of the balls serves as the power transfer interface between the screw and nut to greatly reduce the frictional resistance generated while the balls roll.

The ball screw is usually provided with preload inside itself for eliminating axial clearance among the balls, the screw, and the nut to further increase the rigidity, positioning precision, and positioning stability of the running ball screw, so the preload is one of significant indexes of measuring the rigidity, positioning precision, and positioning stability of the running ball screw. However, after the ball screw is used for a while, wear and tear among the screw, the nut, and the balls leads to axial clearance to make the preload disappear gradually, so the rigidity, positioning precision, and positioning stability of the ball screw become decreasing.

Taiwan Patent Laid-open No. 201204960 disclosed a method diagnostic of preload ineffectiveness of a ball screw and a device based on the method, in which a voiceprint signal generated while the ball screw is working can be filtered by empirical mode decomposition (EMD), then processed by Hilbert-Huang transform (HHT) to generate Hilbert-Huang spectrum (HHS), next processed by multi-scale entropy extraction to generate multi-scale entropy complexity mode, and after the raw multi-scale entropy complexity mode and the current multi-scale entropy complexity mode are compared, whether a preload of the ball screw disappears or not can be effectively diagnosed. However, in the process of measurement based on this method, the measurement is not applied straight to how the ball screw is forced and the measuring accuracy is adversely affected very easily subject to other environmental factors, such as vibration, noise, or frequency generated during the processing, so it still fails to provide accurate measuring outcome.

SUMMARY OF THE INVENTION

The primary objective of the present invention is to provide a ball screw which is capable of sensing a preload for monitoring the preload in real time.

The secondary objective of the present invention is to provide a ball screw which is not subject to any environmental factor, because it senses a preload directly, to have more accurate sensing result relatively.

The foregoing objectives of the present invention are attained by the ball screw formed of a nut, a screw, and a plurality of balls. The nut includes an internal thread surrounding an imaginary central axis of the ball screw. The screw includes an external thread surrounding the imaginary central axis. The balls are mounted between the internal and external threads in a way that the balls roll therebetween. The ball screw is characterized in that the nut includes a mounting hole having a mounting surface therein, the mounting surface corresponds to the internal thread in a direction that the mounting surface is substantially perpendicular to the imaginary central axis, and a force sensor is mounted to the mounting surface. The force sensor can directly sense a preload applied to the nut from the balls, so an output signal of the force sensor can enable a user to monitor the status that the preload of the ball screw is maintained to immediately know whether the preload is insufficient and to do proper adjustment if the preload is insufficient

DETAILED DESCRIPTION OF PREFERRED EMBODIMENTS

Structural features and desired effects of the present invention will become more fully understood by reference to three preferred embodiments given hereunder. However, it is to be understood that these embodiments are given by way of illustration only, thus are not limitative of the claim scope of the present invention.

Figure 1:
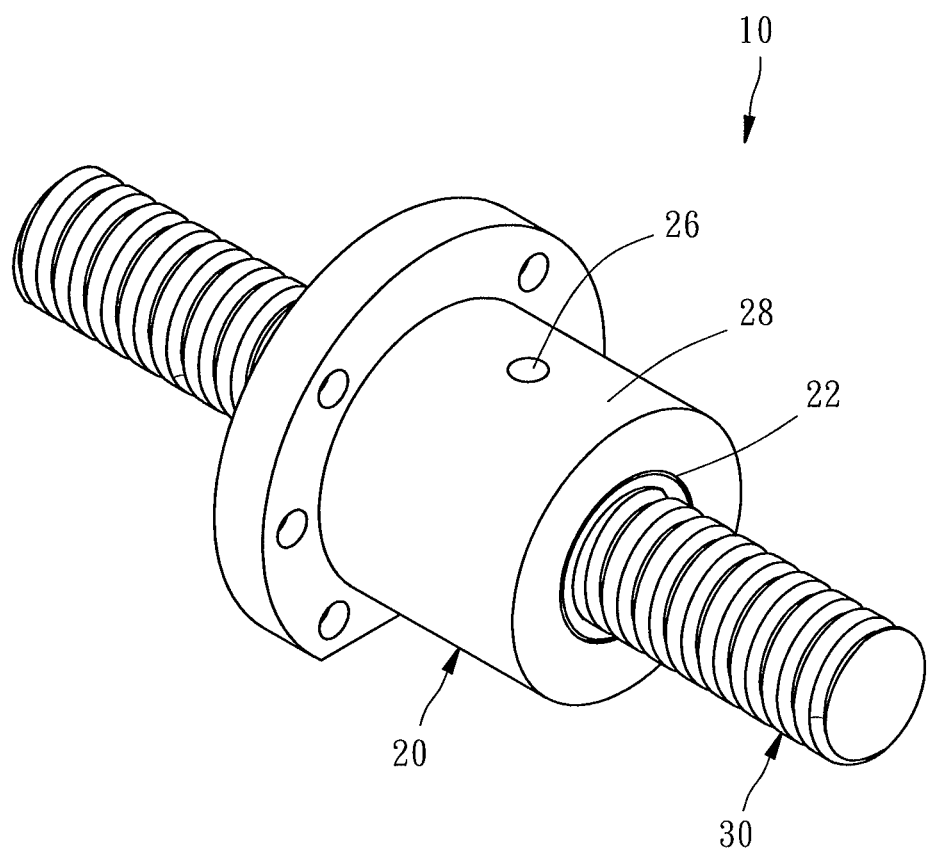
FIG. 1 is a perspective view of a first preferred embodiment of the present invention.
Figure 2:
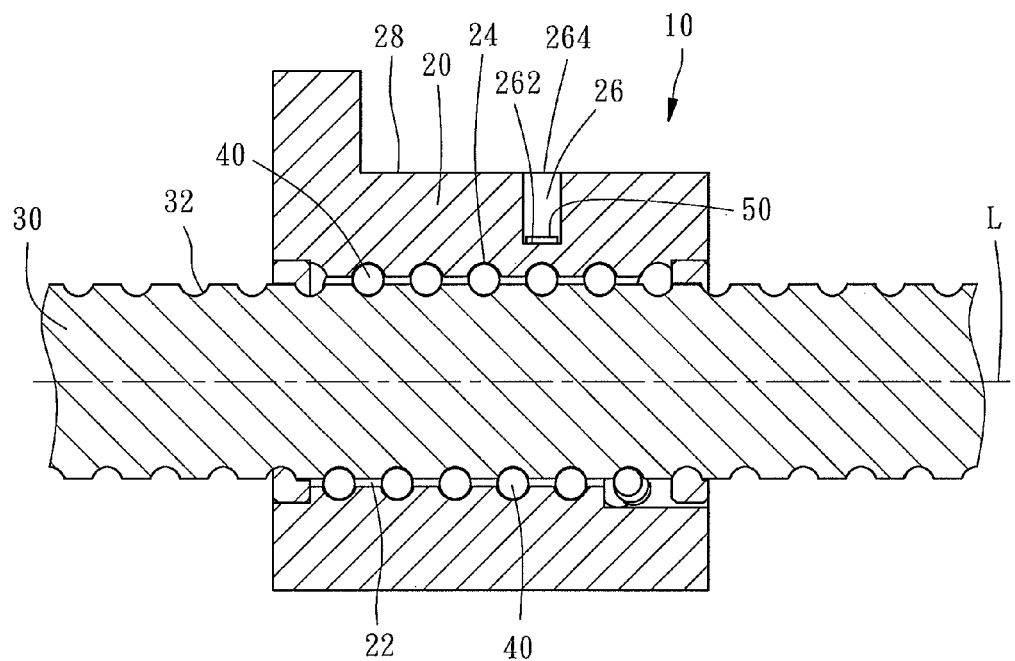
FIG. 2 is a partially sectional view of the first preferred embodiment of the present invention.

Referring to FIGS. 1 and 2, a ball screw 10 capable of sensing a preload in accordance with a first preferred embodiment of the present invention is formed of a nut 20, a screw 30, and a plurality of balls 40. The detailed descriptions and operations of these elements as well as their interrelations are recited in the respective paragraphs as follows.

The ball screw 10 defines an imaginary central axis L. The nut 20 includes a through hole 22 sharing the same imaginary central axis L and an internal thread 24 formed on an internal peripheral wall of the through hole 22 and surrounding the imaginary central axis L. The screw 30 is rotatably inserted into the through hole 22 and includes an external thread 32 surrounding the imaginary central axis L. The balls 40 are mounted between the internal thread 24 and the external thread 32 in a way that the balls 40 can roll therebetween and in this way, the power of the screw 30 can be transferred to the nut 20 to make the screw 20 move linearly. Besides, the rolling of the balls can greatly reduce the frictional resistance in the process of the movement of the nut 20, The difference between the ball screw 10 of the present invention and the prior art lies in that a mounting hole 26 is formed on the nut 20 and includes a mounting surface 262 therein. The mounting surface 262 corresponds to the internal thread 24 in a direction that the mounting surface 26 is substantially perpendicular to the imaginary central axis L, e.g. downward direction as shown in FIG. 2. A force sensor 50 is mounted to the mounting surface 262 and can be but not limited to a strain gauge for directly sensing a preload applied to the nut 20 from the balls 40.

In this preferred embodiment, the mounting hole 26 is a blind hole and recessed inwardly from an external cylindrical surface 28 of the nut 20 in a direction that the mounting hole 26 is perpendicular to the imaginary central axis L. In this way, the mounting hole 26 can be easily formed and very close to the internal thread 24 to make the force sensor 50 more sensitive for sensing the preload.

However, in the ball screw of the present invention, the location of the mounting hole of the nut is not limited to that of the aforesaid preferred embodiment and can be wherever it radially corresponds to the mounting surface of the internal thread for mounting the force sensor. Besides, the mounting surface is not limited to a planar surface. For example, in a second preferred embodiment of the present invention as shown in FIG. 3, the mounting hole 62 of the nut 60 includes a convex mounting surface 622; in a third preferred embodiment of the present invention, the mounting hole 72 of the nut 70 includes a concave mounting surface 722.

Figures 3, 4:
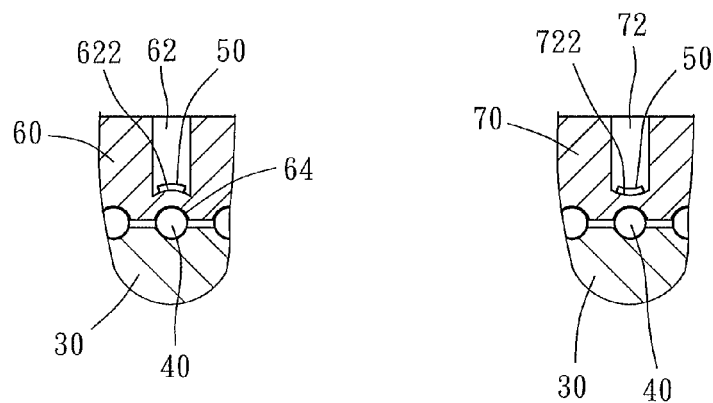
FIG. 3 is a sectional view of a part of a second preferred embodiment of the present invention.
FIG. 4 is a sectional view of a part of a third preferred embodiment of the present invention.

It is worth mentioning that in the aforesaid second preferred embodiment, as shown in FIG. 3, the mounting surface 622 has a radius of curvature which is equal to that of the internal thread 64 of the nut 60, so the distance between each portion of the force sensor 50 and the internal thread 64 is equal to result in preferable sensing effect.

What is claimed is:

1. A ball screw capable of sensing a preload, comprising:
a nut having an internal thread surrounding an imaginary central axis of the ball screw;
a screw inserted into the nut and having an external thread surrounding the central axis; and
a plurality of balls mounted between the internal thread of the nut and the external thread of the screw in a way that the balls run between the internal and external threads;
wherein the nut has an outer surface and a mounting hole having a bottom surface serving as a mounting surface, the mounting hole of the nut inwardly extends from the outer surface of the nut in a direction that is perpendicular to the imaginary central axis, and a force sensor is mounted to the mounting surface.

2. The ball screw as defined in claim 1, wherein the force sensor is a strain gauge.

3. The ball screw as defined in claim 1, wherein the mounting surface of the nut is a planar surface.

4. The ball screw as defined in claim 1, wherein the mounting surface of the nut is convex.

5. The ball screw as defined in claim 4, wherein the convex mounting surface comprises a radius of curvature which is equal to that of the internal thread of the nut.

6. The ball screw as defined in claim 1, wherein the mounting surface of the nut is concave.

7. The ball screw as defined in claim 1, wherein the nut comprises a cylindrical surface formed at an external side thereof and the mounting hole is a blind hole recessed from the cylindrical surface.

* * * * *